United States Patent
Chang

(10) Patent No.: US 7,876,968 B2
(45) Date of Patent: Jan. 25, 2011

(54) APPARATUS OF COMPRESSING IMAGE DATA AND A METHOD THEREOF

(75) Inventor: Fang-Chen Chang, Tainan County (TW)

(73) Assignee: Himax Technologies Limited, Sinshih Townshiptainan County (TW)

(*) Notice: Subject to any disclaimer, the term of this patent is extended or adjusted under 35 U.S.C. 154(b) by 771 days.

(21) Appl. No.: 11/872,082

(22) Filed: Oct. 15, 2007

(65) Prior Publication Data

US 2009/0097766 A1 Apr. 16, 2009

(51) Int. Cl.
*G06K 9/36* (2006.01)
*G06K 9/46* (2006.01)

(52) U.S. Cl. ...................... 382/245; 382/251

(58) Field of Classification Search .......... 382/164, 382/173, 232, 233, 236, 245, 246, 248, 250, 382/251; 375/240.12, 240.16, 240.18, 240.2, 375/240.24, 240.25, E7.093, E7.142; 348/409.1; 341/50

See application file for complete search history.

(56) References Cited

U.S. PATENT DOCUMENTS

| | | | | |
|---|---|---|---|---|
| 5,253,078 A | * | 10/1993 | Balkanski et al. | 382/250 |
| 5,583,657 A | * | 12/1996 | Jeong | 382/248 |
| 5,933,532 A | * | 8/1999 | Mihara | 382/232 |
| 6,278,801 B1 | * | 8/2001 | Boon | 382/246 |
| 6,549,677 B1 | * | 4/2003 | Suzuki et al. | 382/250 |
| 6,625,214 B1 | * | 9/2003 | Umehara et al. | 375/240.12 |
| 7,289,670 B2 | * | 10/2007 | Boon | 382/233 |
| 7,627,180 B2 | * | 12/2009 | Tabuchi et al. | 382/232 |
| 2009/0097766 A1 | * | 4/2009 | Chang | 382/245 |

* cited by examiner

*Primary Examiner*—Amir Alavi
(74) *Attorney, Agent, or Firm*—Thomas, Kayden, Horstemeyer & Risley

(57) ABSTRACT

An apparatus for compressing an image data with an array of pixels comprising a data length is disclosed. The apparatus comprises a rearranging unit, a transformation operator, a quantizer and a coding operator. The rearranging unit is configured to transform the array to form a rearranged block with a mark value. The transformation operator is configured to obtain transform coefficients of the rearranged block according to a predetermined transformation. The quantizer is configured to quantize the transform coefficients. The coding operator is configured to generate a result data by coding the transform coefficients which is quantized and the mark value according to a predetermined coding method.

12 Claims, 4 Drawing Sheets

APPARATUS OF COMPRESSING IMAGE DATA AND A METHOD THEREOF

BACKGROUND OF THE INVENTION

1. Field of the Invention

The present invention relates to data processing, and in particular relates to methods and devices for image compression.

2. Description of the Related Art

The rapid growth of digital imaging applications, including desktop publishing, multimedia, teleconferencing, and high-definition television (HDTV) has increased the need for efficient and standardized image compression techniques. Without image compression, the transmission of images would require an unacceptable bandwidth in many applications. As a result, methods of compressing images have been the subject of numerous research publications. Image compression schemes convert an image consisting of a two-dimensional array of pixels into a sequence of bits which are to be transmitted over a communication link. Each pixel represents the intensity of the image at a particular location therein. The transmission link may be an ordinary telephone line.

Consider an image comprising a gray-scale representation of a photograph at a resolution of 1000.times.1000 lines. Each pixel typically consists of 8 bits which are used to encode 256 possible intensity levels at the corresponding point on the photograph. Hence, without compression, transmission of the photograph requires that 8 million bits be sent over the communication link. A typical telephone line is capable of transmitting about 9600 bits per second; hence the picture transmission would require more than 10 minutes. Transmission times of this magnitude are unacceptable.

As a result, image compression systems are needed to reduce the transmission time. It will also be apparent to those skilled in the art that image compression systems may also be advantageously employed in image storage systems to reduce the amount of memory needed to store one or more images.

The compression of an image typically requires two steps. In the first step, the image is transformed to a new representation in which the correlation between adjacent pixels is reduced. This transformation is usually completely reversible, that is, no information is lost at this stage. The number of bits of data needed to represent the transformed image is at least as large as that needed to represent the original image. The purpose of this transformation is to provide an image representation which is more ideally suited to known compression methods.

In the second step, referred to as quantization, each pixel in the transformed image is replaced by a value which is represented in fewer bits, on average, than the original pixel value. In general, the original gray scale is replaced by a new scale which has coarser steps and hence can be represented in fewer bits. The new gray scale typically has levels in which the different steps are of different sizes. The new gray scale is calculated from the statistical distribution of the pixel values in the transformed image.

The discrete cosine transform (DCT) is known as a basic technique among the transformations. For analysis of two-dimensional (2D) signals such as images, we need a 2D version of the DCT. Rather than taking the transformation of the images as a whole, the DCT is applied separately to 8×8 of 16×16 blocks of the image. However, due to the restriction of this size, it needs many line buffers for hardware implementation to reference the pixel value of 8 rows or 16 rows of the image at the same time. For example, the transformation of an 8×8 block needs 7 line buffers to temporarily store the pixel values of the other 7 rows of the image. Because of the line buffer requirement, the implementation cost of DCT-based image compression is difficult to decrease.

BRIEF SUMMARY OF INVENTION

A detailed description is given in the following embodiments with reference to the accompanying drawings.

An apparatus for compressing an image data with an array of pixels comprising a data length is disclosed. The apparatus comprises a rearranging unit, a transformation operator, a quantizer and a coding operator. The rearranging unit is configured to transform the array to form a rearranged block with a mark value. The transformation operator is configured to obtain transform coefficients of the rearranged block according to a predetermined transformation. The quantizer is configured to quantize the transform coefficients. The coding operator is configured to generate a result data by coding the transform coefficients which is quantized and the mark value according to a predetermined coding method.

A method for compressing an image data with an array of pixels comprising a data length is disclosed. First, the array is transformed to form a rearranged block with mark values by a rearrange unit. Next, transform coefficients of the rearranged block is obtained according to a predetermined transformation by a transformation operator. Then, the transform coefficients are quantized by a quantizer. Finally, a result data is generated by coding the transform coefficients which is quantized and the mark value according to a predetermined coding method by a coding operator.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

To reduce the number of the line buffers needed for transformation-based image compression, rather than performing the transformation block-by-block for an image data, a method of performing transformation based on arrays is disclosed. An image data comprises a two dimensional array of pixels organized as m rows and $n^2$ columns. For obtaining the transform coefficients of the image data, an array with $n^2$ pixels is rearranged to form a block organized as a n×n two dimensional array, wherein the dimension of the array is less than n. However, rearranging the array to form a block may increase the portion of high frequency in the image. Thus, the rearrangement of the block from the array may affect the result of the compression rate.

Figure 1A:
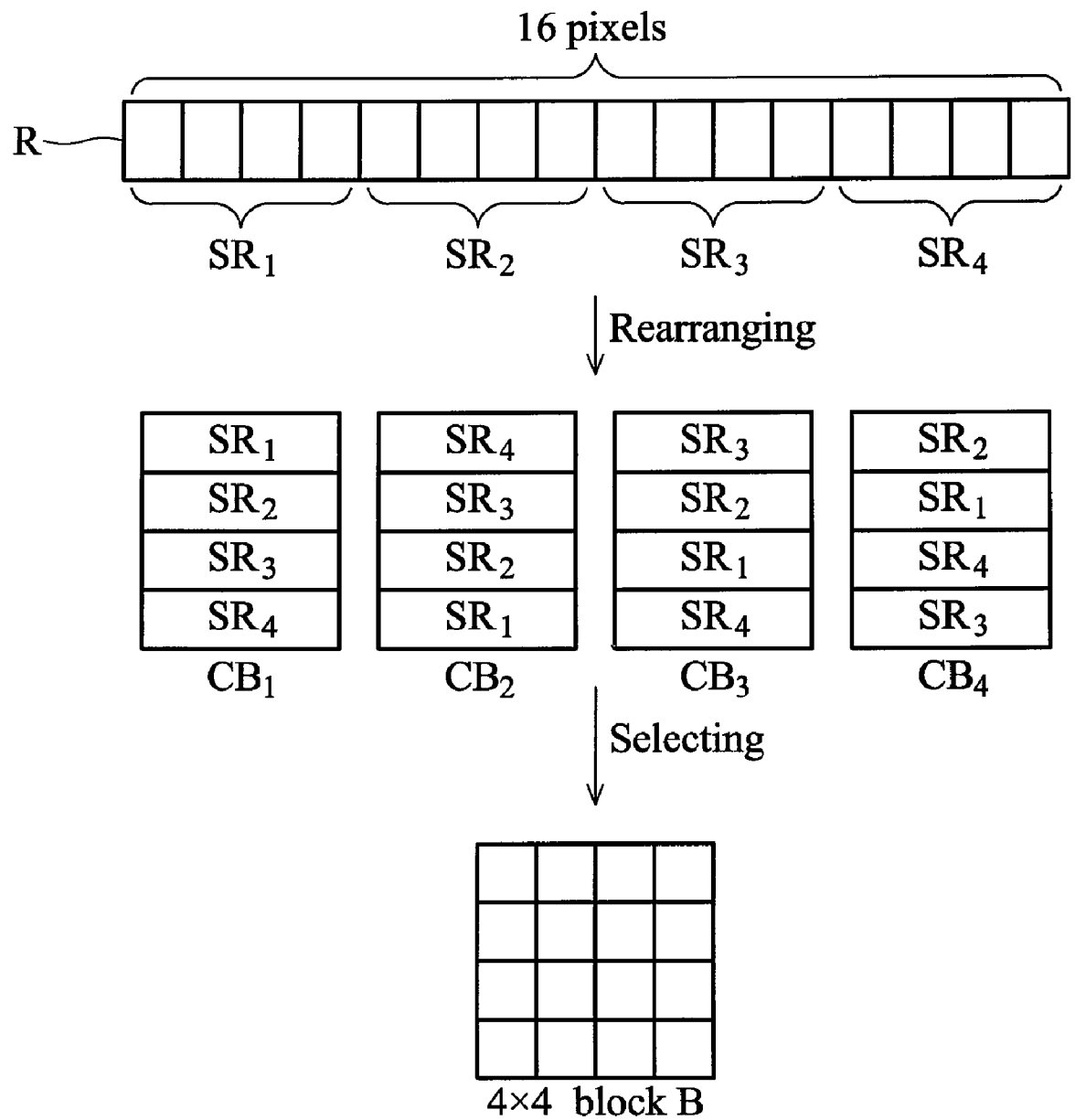
FIG. 1A is a schematic view showing an exemplar of rearranging an 1×16 array R to form a 4×4 block B in an embodiment of the invention.

FIG. 1A is a schematic view showing an exemplar of rearranging an 1×16 array R to form a 4×4 block B in an embodiment of the invention. To form a 4×4 block while preserving the spatial correlation of array R to decrease the high frequency caused by rearrangement, array R is equally divided into sub-arrays $SR_1 \sim SR_4$, and each sub-array is an 1×4 array. Further, the sub-arrays $SR_1 \sim SR_4$ are arranged in a different sequence to form plural candidate blocks $CB_1 \sim CB_4$. For example, the row sequence of $CB_1$ may be $SR_1$, $SR_2$, $SR_3$, $SR_4$, and the row sequence of $CB_2$ may be $SR_4$, $SR_3$, $SR_2$, $SR_1$, etc. One of the candidate blocks $CB_1 \sim CB_4$ where the high frequency signals are least, is selected to be the block B for row R. The frequency of each candidate block may be calculated by any two adjacent elements in each candidate block. And, for recording the sequence of sub-arrays in block B, a mark value corresponding to block B is generated. After transforming array R to form block B, the transform coefficients of array R can be obtained by performing transformation over block B. The transform coefficients of each array in an image data with a two dimensional array of pixels can be obtained separately. Thus, no line buffer is needed for the disclosed method of image compression.

Figure 1B:
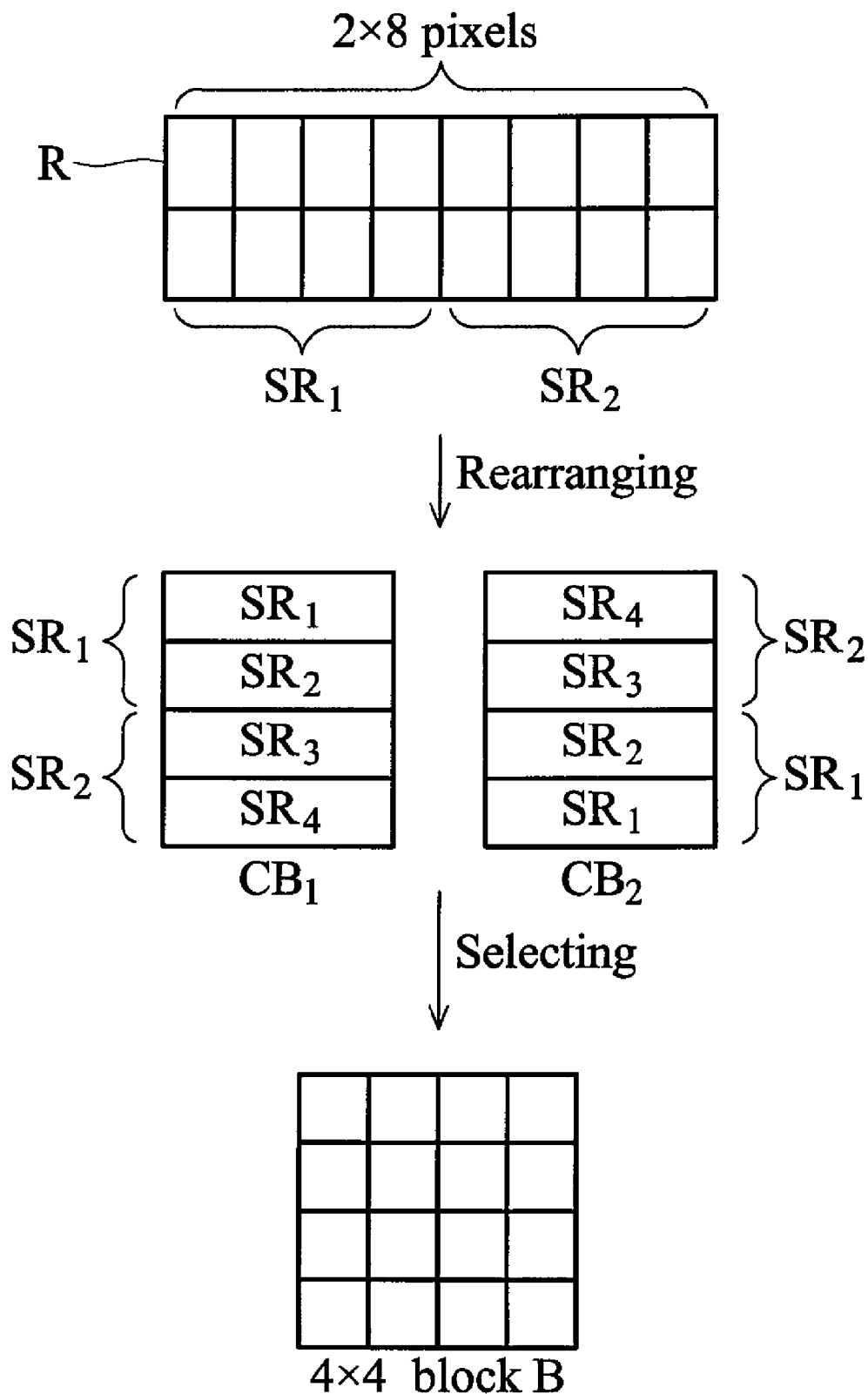
FIG. 1B shows an exemplar of rearranging a 2×8 array R to form a 4×4 block B in another embodiment of the invention.

In another embodiment, FIG. 1B shows an exemplar of rearranging a 2×8 array R to form a 4×4 block B. To form a 4×4 block while preserving the spatial correlation of array R to decrease the high frequency caused by rearrangement, array R is equally divided into sub-arrays $SR_1 \sim SR_2$, and each sub-array is a 2×4 array. Further, the sub-arrays $SR_1 \sim SR_2$ are arranged in a different sequence to form plural candidate blocks $CB_1 \sim CB_2$. For example, the row sequence of $CB_1$ may be $SR_1$, $SR_2$ and the row sequence of $CB_2$ may be $SR_2$, $SR_1$. One of the candidate blocks $CB_1 \sim CB_2$ where the high frequency signals are least, is selected to be the block B for row R. The frequency of each candidate block may be calculated by any two adjacent elements in each candidate block. And, for recording the sequence of sub-arrays in block B, a mark value corresponding to block B is generated. After transforming array R to form block B, the transform coefficients of array R can be obtained by performing transformation over block B. The transform coefficients of each array in an image data with a two dimensional array of pixels can be obtained separately. Thus, only one line buffer is needed for reading 2 rows of the image data to form a 4×4 block in the disclosed method of image compression. Similarly, only 7 line buffers are needed for reading 8 rows of the image data to form a 16×16 block in the disclosed method of image compression.

Figure 2:
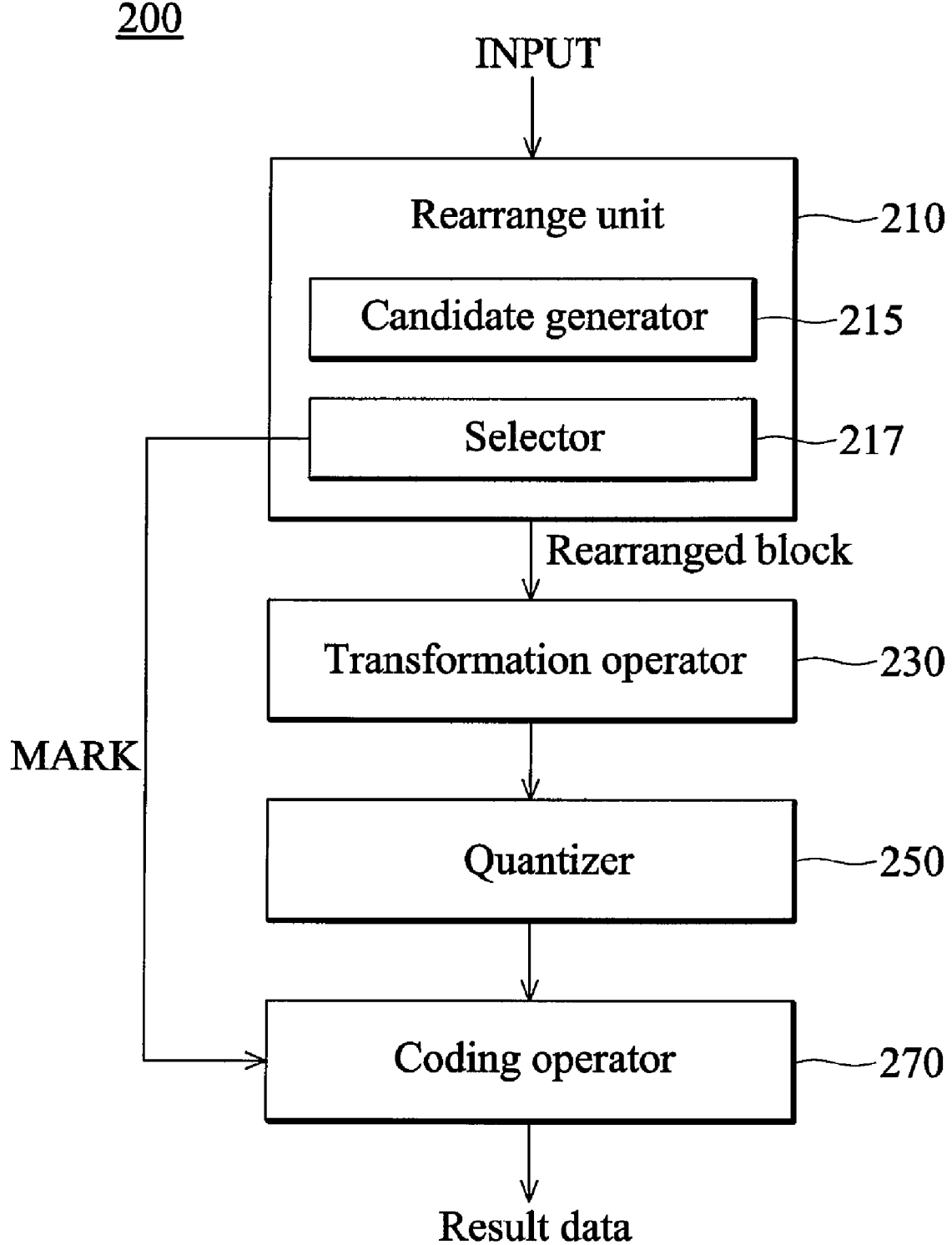
FIG. 2 is a diagram illustrating device 200 of compressing an image data with an array of pixels in an embodiment of the invention.

FIG. 2 is a diagram illustrating device 200 for compressing an image data in an embodiment of the invention. Device 200 comprises a rearranging unit 210, a transformation operator 230, a quantizer 250 and a coding operator 270. Preprocessing unit 210 further comprises a candidate generator 215 and a selector 217.

First, rearranging unit 210 receives an image data INPUT with an array of pixels comprising a data length $n^2$ and transforms the array to form a rearranged block. In rearranging unit 210, candidate generator 215 generates plural candidate blocks organized as a plurality of rows and columns for the array by equally dividing the array into n sub-arrays. Length of each sub-row is n and rearranging unit 210 arranges the sub-arrays into the rows of each candidate block according to different sub-row sequences. Then, selector 217 computes variations of each candidate block by calculating the difference of any two adjacent elements in each candidate block. According to the variations, selector 217 selects one of the candidate blocks where the high frequency is least to be the rearranged block for the array, and generates a mark value MARK to record the sequence of the sub-arrays in the rearranged block. After determining the rearranged block for the array, transformation operator 230 receives the rearranged block and performs the DCT over the rearranged block to obtain the transform coefficients of the array, where DCT may be replaced by any other transformation based on the rearranged blocks. Next, quantizer 250 quantizes the transform coefficients. Finally, coding operator 270 encodes the quantized transform coefficients and the mark value MARK to generate a result data.

Figure 3:
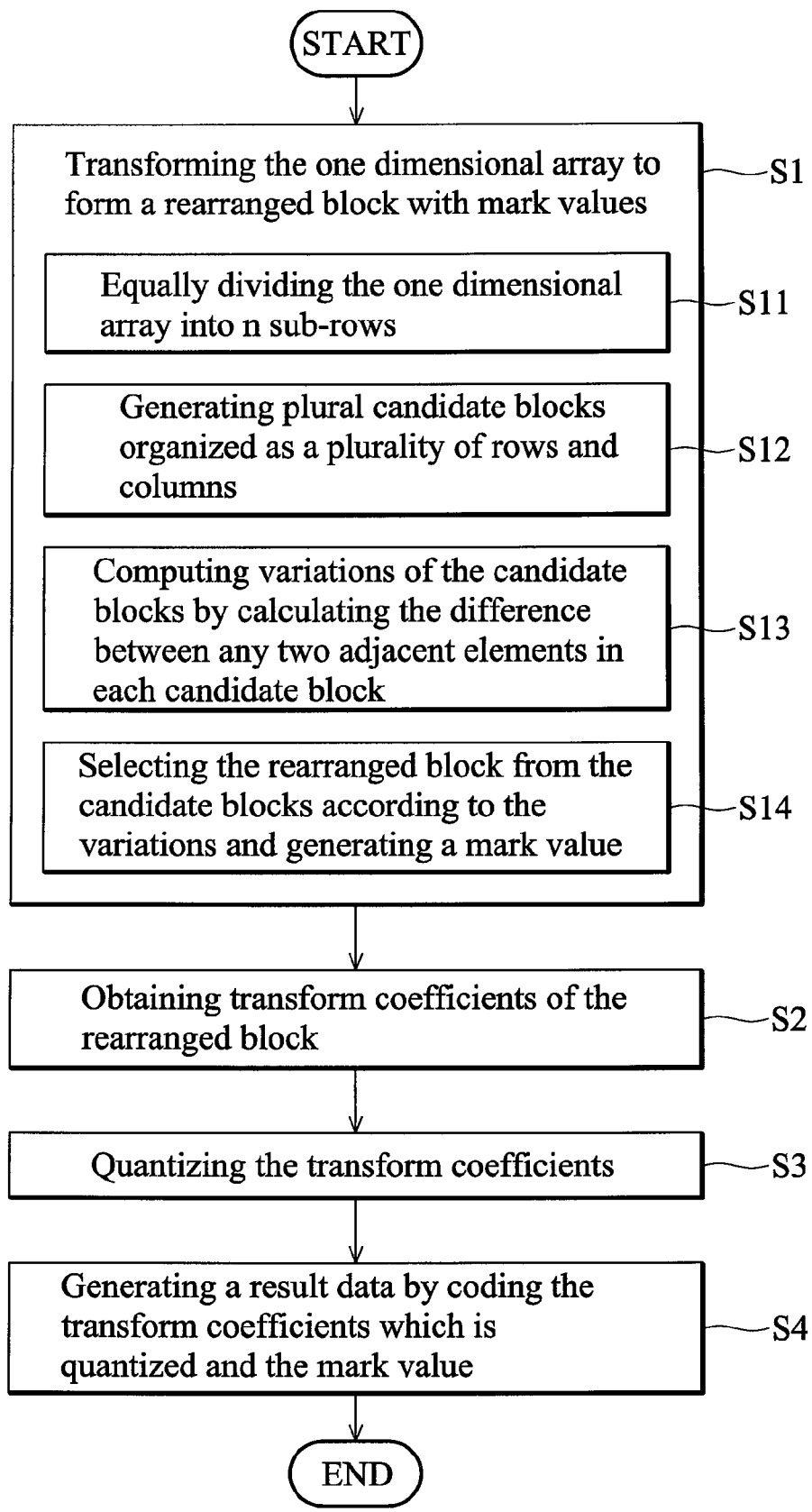
FIG. 3 is a flowchart illustrating the method of compressing an image data with an array of pixels in an embodiment of the invention.

FIG. 3 is a flowchart illustrating the method of compressing an image data with an array of pixels comprising data length $n^2$ of an embodiment in the invention. First, the array is transformed to form a rearranged block with mark values by rearrange unit 210 (S1). To rearrange the array to form the rearranged block, the array is equally divided into n sub-arrays (S11). Accordingly, length of the sub-arrays is n. Then, plural candidate blocks organized as a plurality of rows and columns are generated by arranging the sub-arrays into the rows of each candidate block according to the plural predetermined sequence by candidate generator 215 (S12). Accordingly, each candidate block corresponds to one of the predetermined sequences. To determine the rearranged block from the candidate blocks, variations of the candidate blocks are computed by calculating the difference between any two adjacent elements in each candidate block (S13). Then, the rearranged block is selected from the candidate blocks according to the variations and a mark value is generated for recording the sequence of the sub-arrays in the rearranged block by selector 217 (S14). Next, transform coefficients of the rearranged block are obtained according to a predetermined transformation such as DCT, for example, by transformation operator 230 (S2). Then, the transform coefficients are quantized by quantizer 250 (S3). Finally, a result data is generated by coding the transform coefficients which is quantized and the mark value according to a predetermined coding method such as entropy coding, for example, by coding operator 270 (S4).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for compressing an image data with an array of pixels comprising a data length, comprising:
    a rearranging unit configured to transform the array to form a rearranged block with a mark value;
    a transformation operator configured to obtain transform coefficients of the rearranged block according to a predetermined transformation;
    a quantizer configured to quantize the transform coefficients; and
    a coding operator configured to generate a result data by coding the transform coefficients which is quantized and the mark value according to a predetermined coding method.

2. The data transformation device as claimed in claim 1, wherein the rearranging unit comprises:
    a candidate generator configured to generate a plurality of candidate blocks organized as a plurality of rows and columns by equally dividing the array into plural sub-arrays, and arranging the sub-arrays into the rows of each candidate block according to a plurality of predetermined sequence, each candidate block corresponding to one of the predetermined sequences; and a selector configured to select one of the candidate blocks to be the rearranged block and generate the mark value of the rearranged block for recording the sequence of the sub-arrays in the rearranged block.

3. The data transformation device as claimed in claim 2, wherein the selector further calculates variations of the candidate blocks and selects the rearranged block according to the variations.

4. The data transformation device as claimed in claim 3, wherein the variations of the candidate blocks are calculated based on the difference between any two adjacent elements in each candidate block.

5. The data transformation device as claimed in claim 1, wherein the predetermined transformation is discrete cosine transformation (DCT).

6. The data transformation device as claimed in claim 1, wherein the predetermined coding method is entropy coding.

7. A method for compressing an image data with an array of pixels comprising a data length, comprising:

transforming the array to form an rearranged block with mark values by a rearrange unit;

obtaining transform coefficients of the rearranged block according to a predetermined transformation by a transformation operator;

quantizing the transform coefficients by a quantizer; and generating a result data by coding the transform coefficients which is quantized and the mark value according to a predetermined coding method by a coding operator.

8. The method as claimed in claim 7, wherein transforming the array to form the rearranged block comprises:

equally dividing the array into plural sub-arrays;

generating a plurality of candidate blocks organized as a plurality of rows and columns by arranging the sub-arrays into the rows of each candidate block according to a plurality of predetermined sequence, each candidate block corresponding to one of the predetermined sequences; and selecting one of the candidate blocks to be the rearranged block and generating the mark value for recording the sequence of the sub-arrays in the rearranged block.

9. The method as claimed in claim 8, further comprising computing variations of the candidate blocks and selecting the rearranged block according to the variations.

10. The method as claimed in claim 9, wherein the variations of the candidate blocks are calculated based on the difference between any two adjacent elements in each candidate block.

11. The method as claimed in claim 7, wherein the predetermined transformation is discrete cosine transformation (DCT).

12. The method as claimed in claim 7, wherein the predetermined coding method is entropy coding.

* * * * *